United States Patent Office 2,919,383
Patented Dec. 29, 1959

2,919,383
FLASH APPARATUS AND METHOD
Harold E. Edgerton, Belmont, Mass.

Application June 3, 1957, Serial No. 663,268

14 Claims. (Cl. 315—241)

The present invention relates to flash-producing apparatus and methods, and, more particularly, to flash devices that may be utilized as sources of illumination.

In my co-pending application, Serial No. 588,906, filed June 1, 1956, for "Flash Tube and Apparatus," there are disclosed small flash tubes or devices and appropriate circuits for producing flashes of high-intensity illumination that may be used for such purposes as, for example, flash photography, stroboscopic investigations and, in general, as a source of flash illumination. There are times, however, when extremely simple apparatus is desirable or even required for producing flash illumination of high intensity.

The present invention, accordingly, deals with, and has as an object the provision of, a new and improved and vastly simplified flash apparatus that, while embodying some of the features of the flash devices disclosed in the said copending application, is simpler, less costly and more readily adapted for operation at high flash repetition rates.

A further object is to provide a new and improved electric flash apparatus that employs a minimum of electrical components.

An additional object is to provide a new and improved method of operating flash devices of this character.

Still a further object is to provide a new and improved flash device that, while particularly useful for flash illumination, may also find more general application where electric energy is to be discharged or flashed through a discharge gap. In summary, the invention, from perhaps its broadest aspect, contemplates a flash device having a pair of electrodes inserted with opposite preferably open ends of a normally insulative envelope of cross dimension just slightly larger than that of the electrodes. Means is provided for rendering the region of the normally insulative envelope bounding the space between the electrodes substantially conductive in order to initiate an electric discharge between the electrodes within the said space when a voltage is applied between the electrodes. Means is preferably provided for permitting relative movement of the electrodes to vary the spacing between them within the envelope.

Other and further objects will be explained hereinafter and will be more particularly pointed out in the appended claims.

Figure 1:
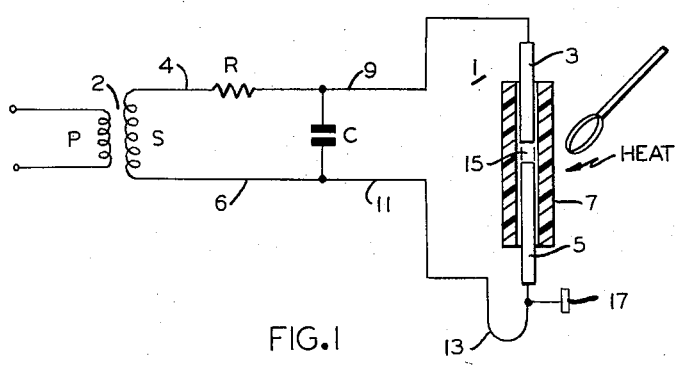
Figure 2:
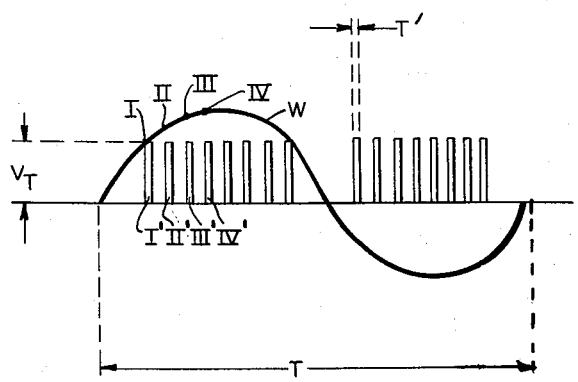

The invention will now be described in connection with the accompanying drawing, Fig. 1 of which is a schematic circuit diagram illustrating a preferred circuit for operating the preferred flash device of the present invention, the device being illustrated in longitudinal cross-section; and Fig. 2 is an explanatory wave-form diagram.

Referring to Fig. 1, a flash device is shown at 1 having a pair of longitudinally extending electrodes 3 and 5 which are disposed or inserted within opposite open ends of a normally insulative preferably light-transparent tubular envelope 7 of inner cross-dimension just slightly larger than that of the electrodes 3 and 5. The electrodes 3 and 5 are preferably cylindrical rods of tungsten and the envelope 7 is preferably a hollow cylinder of fused quartz or some other high-temperature envelope material that, when the present invention is used for purposes of illumination, is light-transparent at least in the region bounding the space 15 between the electrodes 3 and 5.

While the flash device 1, as before stated, may be used for many purposes, in order to illustrate a preferred application of the same to the production of successive trains or flashes of light, the apparatus of Fig. 1 is shown of a type embodying alternating-current charging and discharging circuits. It is to be understood, however, that direct-current charging circuits such as those described in my said copending application and in my United States Letters Patent Nos. 2,478,901 and 2,781,707, issued August 16, 1949, and February 19, 1957, respectively, may also be used. In Fig. 1, the primary winding P of, for example, a mains-operated transformer 2, is shown cooperating with a step-up secondary winding S. The upper terminal of the winding S is connected through conductor 4 and a charging resistor R to the upper terminal of one or more energy-storage devices, such as the capacitor or condenser C, and the lower terminal of the winding S connects by conductor 6 to the lower terminal of the capacitor C, thereby forming a charging circuit. The voltage developed across the capacitor C in this alternating-current charging circuit will, of course, vary in accordance with the alternating-current wave form of any type, shown as of sinusoidal configuration W in Fig. 2.

The flash device 1 is connected in a discharge circuit associated with the capacitor C, as follows. The upper terminal of the capacitor C is connected by conductor 9 to the outer end of the electrode 3 and the lower terminal is connected by conductor 11 to the outer end of the other electrode 5. In accordance with the present invention, for purposes hereinafter described, the conductors 9 and 11, or either one of them, may be flexible, as shown at 13, so as to permit the electrodes 3 and 5 to be relatively longitudinally moved within the envelope 7 in order to vary the spacing 15 between the electrodes 3 and 5 within the envelope 7. Thus, in Fig. 1, an insulative handle 17 is shown rigidly connected to the electrode 5 in order to permit the longitudinal insertion or withdrawal of the same. Similar movement of the electrode 3 may, if desired, be effected, though it is sufficient merely to obtain relative movement of the electrodes 3 and 5, as later explained.

Assuming, for the moment, that the potential or voltage developed upon the capacitor C during the charging of the same is sufficient to produce a discharge in the space 15 between the electrodes 3 and 5 within the envelope 7, the discharge will be very rapid and of time duration dependent solely upon the time constant of the discharge circuit comprising the capacitor C, the conductor 9, the principal electrode 3, the air or other gaseous medium in the space 15, the electrode 5 and the conductors 13 and 11. It is only necessary that the capacitor C charge to a value sufficient to overcome the break-down potential between the electrodes 3 and 5 in order to produce a discharge in the space 15 between the electrodes 3 and 5. If the alternating-current voltage W is, for example, mains voltage of 60 cycles frequency, the time constant of the discharge circuit may be very small compared with the period T of the alternating-current voltage. Once the voltage waveform W reaches the threshold voltage $V_T$ (point I) at which the space 15 between the electrodes 3 and 5 may break down, a rapid discharge or flash impulse I′ is produced that will terminate very quickly in a time T′ in view of the small time constant of the discharge circuit. As the capacitor C becomes recharged above the threshold value $V_T$, at successive further points II, III, IV, etc. of the wave form W, successive discharges or flash impulses II', III', IV', etc. will be produced.

A large number of very short-duration flash impulses, therefore, may be generated. If the wave form W has a negative going half-cycle, as shown in Fig. 2, a similar train of flashes of the same substantially constant amplitude will be produced in the flash device 1 during the negative half-cycle.

It has been found, however, that even when very high voltages are developed across the capacitor C, a flash device 1 of the character above-described having the principal electrodes 3 and 5 very close to the inner walls of the envelope 7, will not break down. In order simply to initiate the discharge process, accordingly, it has been found that one can readily modify the normally insulative properties of the envelope 7 in the region bounding the space 15 between the electrodes 3 and 5. In the case of quartz, before mentioned, it has been found that while the quartz is an excellent insulator at room temperature, it can be rendered a substantial conductor upon the application of sufficient heat thereto. Heat is shown being applied in Fig. 1 to the region of the envelope 7, bounding the space 15 between the electrodes 3 and 5, by a match. It has been discovered that, upon such heating, the region of the envelope wall bounding the space 15 becomes sufficiently conductive to permit the voltage developed across the capacitor C to initiate a discharge between the electrodes 3 and 5 and thus to start the production of trains of flashes, Fig. 2, substantially synchronized with, though of greater frequency than, the frequency of the alternating current or other voltage employed in the charging circuit. It has been further found that the rendering conductive of the region of the envelope 7 bounding the space 15 may also be accomplished with the aid of an electrical heater, not shown, and with the aid of a spark-producing member as well. As another illustration, if the electrode 5 is inserted into a limiting position of substantial juxtaposition with the electrode 3, illustrated by the dotted lines in the region 15, then sufficient heat is rapidly generated to render the walls of the envelope 7 substantially conductive. Upon slightly withdrawing the electrode 5 from the electrode 3, accordingly, a discharge is produced in the space 15 which thereafter initiates the operation illustrated in Fig. 2. The size of the flashing space 15 is adjustable, by operation of the handle 17, not only to obtain a flashing region of desired dimensions, but, also, to select the electrode spacing that produces the most regularity in the flashes.

As an illustration, velocity of light measurements have been effected with the aid of the apparatus of Fig. 1 by monitoring and comparing the time of transmission of the light pulses and the time of reflection of the same over a known path length. The electrodes 3 and 5 were tungsten rod electrodes about 0.04 inch in diameter and the envelope 7 was a fused quartz envelope tightly fitting about the electrodes 3 and 5. Alternating-current mains voltage was supplied to the primary winding P of the step-up transformer 2, the secondary winding S of which developed a voltage of 5000 volts peak value across a 0.0015 microfarad capacitor C through a charging resistor R of $10^5$ ohms. It was observed that tungsten oxide is emitted from the open ends of the envelope 7 in a continual process during the successive discharges. Not only is the close proximity of the electrode walls to the inner wall of the envelope 7 required for the electrical performance above described and to limit the flash region to the space 15 only, but this is necessary to permit of proper relative longitudinal movement of the electrodes without play.

Further modifications will occur to those skilled in the art and all such are considered to fall within the spirit and scope of the invention as defined in the appended claims.

What is claimed is:

1. A flash device having, in combination, a pair of electrodes inserted within opposite ends of a normally insulative envelope of cross-dimension slightly larger than that of the electrodes, and means for permitting relative movement of the electrodes to vary the spacing between them within the enevelope.

2. A flash device having, in combination, a pair of electrodes inserted within opposite ends of a normally insulative light-transparent envelope of cross-dimension slightly larger than that of the electrodes, and means for permitting relative movement of the electrodes from a limiting position of substantial juxtaposition to vary the spacing between them within the envelope.

3. A flash device having, in combination, a pair of electrodes inserted within opposite ends of a normally insulative envelope of cross-dimension slightly larger than that of the electrodes, means for rendering the region of the normally insulative envelope bounding the space between the electrodes substantially conductive in order to initiate an electric discharge between the electrodes within the said space when a voltage is applied between the electrodes, and means for permitting relative movement of the electrodes to vary the spacing between them within the envelope.

4. A flash device having, in combination, a pair of electrodes inserted within opposite ends of a normally insulative light-transparent envelope of cross-dimension slightly larger than that of the electrodes, and means for rendering the region of the normally insulative envelope bounding the space between the electrodes substantially conductive in order to initiate an electric discharge between the electrodes within the said space when a voltage is applied between the electrodes.

5. A flash device having, in combination, a pair of electrodes inserted within opposite ends of a normally insulative light-transparent envelope of cross-dimension slightly larger than that of the electrodes, and means comprising heat-generating means for rendering the region of the normally insulative envelope bounding the space between the electrodes substantially conductive in order to initiate an electric discharge between the electrodes within the said space when a voltage is applied between the electrodes.

6. A flash device having, in combination, a pair of longitudinally extending electrodes inserted within opposite open ends of a longitudinally extending normally insulative light-transparent envelope of cross-dimension slightly larger than that of the electrodes, and means for permitting relative longitudinal movement of the electrodes to vary the spacing between them within the envelope.

7. A flash device having, in combination, a pair of longitudinally extending electrodes inserted within opposite open ends of a longitudinally extending normally insulative light-transparent envelope of cross-dimension slightly larger than that of the electrodes, means for rendering the region of the normally insulative envelope bounding the space between the electrodes substantially conductive in order to initiate an electric discharge between the electrodes within the said space when a voltage is applied between the electrodes, and means for permitting relative longitudinal movement of the electrodes to vary the spacing between them within the envelope.

8. Flash-producing apparatus having, in combination, an alternating-current voltage charging circuit including a capacitor, a discharge circuit comprising a flash device having a pair of electrodes inserted within opposite ends of a normally insulative light-transparent envelope of cross-dimension slightly larger than that of the electrodes, and means for rendering the region of the normally insulative envelope bounding the space between the electrodes substantially conductive in order to initiate the discharge in the discharge circuit between the electrodes, the period of the alternating current being large compared with the time constant of the said discharge circuit.

9. A method of operating a flash device having a pair of electrodes inserted within opposite ends of a normally insulative envelope of cross-dimension slightly larger than that of the electrodes, that comprises, applying a potential to the electrodes that normally cannot produce a discharge therebetween, and generating heat in the region of the normally insulative envelope bounding the space between the electrodes to render the said region of the envelope substantially conductive, thereby to permit the said potential to discharge between the electrodes.

10. A spark discharge device including in combination, a pair of spark discharge electrodes adapted to be connected in a high voltage circuit, and a transparent member open to the atmosphere having an internal capillary passage in which said electrodes are positioned, said capillary passage being vented to the exterior of said transparent member to provide an escape path into the atmosphere for erosion products.

11. A spark discharge device as claimed in claim 10 and in which there is provided means for permitting relative movement of the electrodes within the capillary passage to vary the spacing between them.

12. A spark discharge device as claimed in claim 10 and in which there is provided means for rendering the region of the capillary passage bounding the space between the electrodes substantially conductive in order to initiate the spark discharge between the electrodes.

13. A spark discharge device as claimed in claim 12 and in which the rendering means comprises heat-producing means.

14. A spark discharge device including in combination, a pair of spark discharge electrodes adapted to be connected in a high voltage circuit, a transparent member having an internal capillary passage in which said electrodes are positioned, said capillary passage being vented to the exterior of said transparent member to provide an escape path for erosion products, and means for permitting relative movement of the electrodes within the capillary passage to vary the spacing between them.

References Cited in the file of this patent

UNITED STATES PATENTS

| | | |
|---|---|---|
| 1,036,884 | Mott | Aug. 27, 1912 |
| 1,799,993 | Staege | Apr. 7, 1931 |
| 2,009,555 | Mathiesen | July 30, 1935 |
| 2,078,689 | Schneider | Apr. 27, 1937 |
| 2,137,732 | Swanson | Nov. 22, 1938 |
| 2,222,093 | Swanson | Nov. 19, 1941 |